March 29, 1927.
H. J. SCHMITT ET AL
AUTOMOBILE LIFTING JACK
Filed Feb. 20, 1926
1,622,352
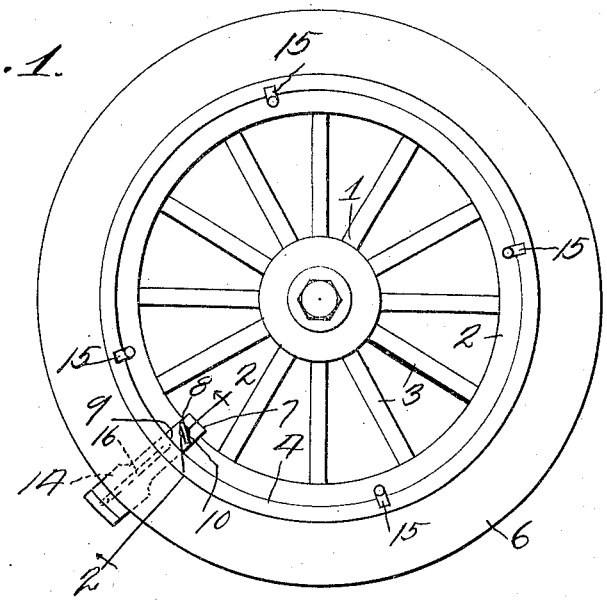
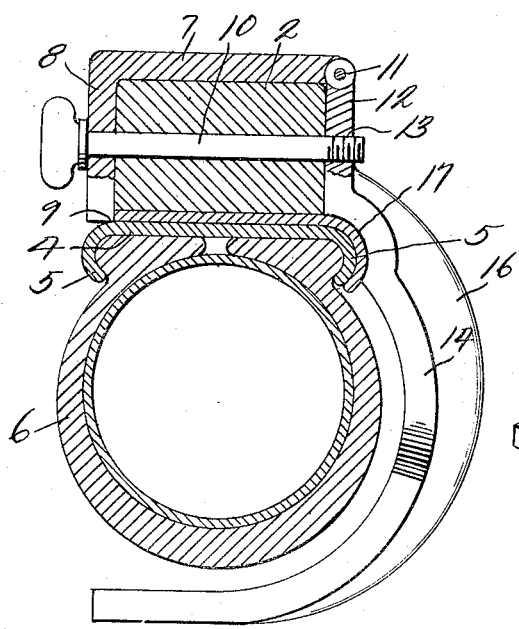
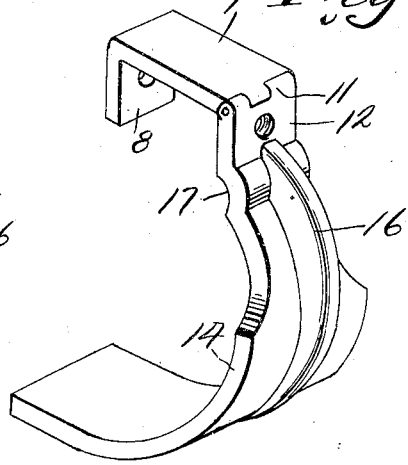
Inventors
H. J. Schmitt and
John Little
By Philip A. H. Ferrell
Attorney Patented Mar. 29, 1927.

1,622,352

UNITED STATES PATENT OFFICE.

HENRY J. SCHMITT AND JOHN LITTLE, OF OMAHA, NEBRASKA.

AUTOMOBILE LIFTING JACK.

Application filed February 20, 1926. Serial No. 89,707.

The invention relates to jacks for automobile wheels, and has for its object to provide a device of this character which may be easily applied to an automobile wheel, and the wheel rotated slightly until the device is in engagement with the ground below the wheel, and when in such position the device will maintain the tire of the wheel out of engagement with the ground, thereby allowing the tire and demountable rim to be removed from the wheel felly for repair or replacement purposes, thereby obviating the laborious operation of handling cumbersome jacks as at present constructed.

A further object is to provide a wheel jack comprising an L-shaped member engaging the inner side of a felly and having one of its arms engaging the outer side of the felly, a downwardly extending arm hingedly connected to the L-shaped member and engaging the other side of the felly and a downwardly and outwardly extending integral arm carried by the hinged arm and extending under the tire in a space relation thereto.

A further object is to provide a downwardly and outwardly extending arm with a recess which engages and receives the inner side of the clincher flanges of the rim for bracing the curved arm, and to provide the curved arm with a reinforcing flange for bracing the same when the arm is supporting the wheel spaced from the ground and receives the weight of the vehicle.

A further object is to proportion the hinged arm and the other arm engaging the sides of the felly whereby they will engage the clincher flanges and brace the arm and prevent side pivotal movement when the arm is moved into engagement with the ground upon rotation of the wheel.

A further object is to provide a removable bolt extending transversely through the arms of the device and the felly for rigidly securing the device to the wheel.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a view elevation of a conventional form of automobile wheel showing the jack device applied thereto.

Figure 2 is a vertical transversely sectional view taken on line 2—2 of Figure 1.

Figure 3 is a perspective view of the device.

Referring to the drawing, the numeral 1 designates a conventional form of automobile wheel, 2 the felly thereof and 3 the spokes. Disposed on the felly 2 is a conventional form of demountable rim 4 having clincher flanges 5 which hold the tire 6. The jack comprises a plate 7 which engages the inner side of the felly 2, and which plate has its outer end provided with a right angularly disposed arm 8 which engages the outer side of the felly 2, and the outer clincher flange 5 at 9, and which engagement at 9 braces the device and prevents pivotal twisting of the same on the bolt 10 when the wheel is rotated for positioning the device below the wheel. Hingedly connected at 11 to the inner end of the plate 7 is an arm 12, through which the bolt 10 is threaded at 13 and which arm engages the clincher flange 5 and additionally prevents a twisting movement of the device when the wheel is rotated. Extending downwardly and outwardly in spaced relation to the tire 6 is a ground engaging arm 14, the lower end of which is relatively wide so it will not imbed itself in the ground and by being spaced from the tire 6 it is obvious when the same is disposed beneath the tire by the rotation of the wheel the operator can easily remove the demountable rim 4 in the usual manner by loosening the clips 15. Arm 14 is provided with a reinforcing rib 16 which is sufficiently strong to brace the arm 14 and prevent bending thereof.

In applying the device the plate 7 and the arm 8 are placed in engagement with the felly, then the arm 12 is moved on its hinging point into engagement with the inner side of the felly 2 which will move the curved arm 14 into position where it will extend around the tire 6 in spaced relation thereto, and after which the bolt 10 is placed in position. It will be seen by providing the hinge 11 a close fit is obtained on the felly, and at the same time the curved arm 14 is allowed to be placed in position and the arms 8 and 12 in engagement with the clincher flanges 5.

From the above it will be seen that an automobile wheel jack is provided which is simple in construction, the parts reduced to a minimum, and one which may be easily and quickly applied to a tire. The upper end of arm 14 is provided with a transverse recess 17 which receives the inner clincher flange 5 and is thoroughly braced by said clincher flange, thereby adding to the rigidity of the structure.

The invention having been set forth what is claimed as new and useful is:—

1. The combination with an automobile wheel felly, a demountable rim mounted on said felly, a tire carried by said demountable rim, of a detachable jack carried by said felly, said jack comprising a plate engaging the inner periphery of the felly, an arm carried by said plate and engaging one side of the felly, an arm hingedly connected to the plate and engaging the other side of the felly, ends of said arms engaging the demountable rim, a removable bolt extending through the arms and the felly, and a downwardly and outwardly curved arm carried by the hinged arm and terminating below the tire in spaced relation thereto.

2. The combination with an automobile wheel felly, a demountable rim carried by said felly, a tire carried by said demountable rim, clincher flanges carried by said demountable rim and extending beyond opposite sides of the felly, of a jack, said jack comprising a plate engaging the inner periphery of the felly, arms carried by said plate and engaging opposite sides of the felly, one of said arms being hingedly connected to the plate, a bolt extending through said arms and the felly, said arms engaging the demountable rim, an arm carried by the hinged arm and curving downwardly and outwardly in spaced relation to the tire and terminating beneath the tire, a reinforcing rib carried by said curved arm, said curved arm having its upper end provided with a recess in which one side of the demountable rim is disposed.

3. The combination with an automobile wheel felly, a demountable rim carried by said felly, a tire carried by said rim, of a jack, said jack comprising a U-shaped member in which the felly is disposed, a securing bolt extending through the arms of the U-shaped member and the felly, one of the arms of the U-shaped member being hingedly mounted, said hinged arm of the U-shaped member being provided with a curved arm extending downwardly and outwardly in spaced relation to the tire and terminating under the tire.

In testimony whereof we affix our signatures.

HENRY J. SCHMITT.
JOHN LITTLE.